(12) United States Patent
Calkowski et al.

(10) Patent No.: US 9,292,507 B2
(45) Date of Patent: Mar. 22, 2016

(54) AUTOMATED DOCUMENT REVISION TRIMMING IN A COLLABORATIVE MULTI-USER DOCUMENT STORE

(71) Applicant: VMware, Inc., Palo Alto, CA (US)

(72) Inventors: Grzegorz Calkowski, Winchester, MA (US); Mingzhe Zhuang, Los Altos Hills, CA (US)

(73) Assignee: VMware, Inc., Palo Alto, CA (US)

( * ) Notice: Subject to any disclaimer, the term of this patent is extended or adjusted under 35 U.S.C. 154(b) by 278 days.

(21) Appl. No.: 13/969,243

(22) Filed: Aug. 16, 2013

(65) Prior Publication Data

US 2015/0052100 A1   Feb. 19, 2015

(51) Int. Cl.
*G06F 17/30* (2006.01)
*G06F 17/22* (2006.01)

(52) U.S. Cl.
CPC ...... *G06F 17/30011* (2013.01); *G06F 17/3023* (2013.01); *G06F 17/2288* (2013.01); *G06F 17/30598* (2013.01)

(58) Field of Classification Search
CPC ............... G06F 17/30085; G06F 8/71; G06F 17/30117; G06F 17/3023; G06F 17/30598; G06F 17/2288
USPC .......................................................... 707/616
See application file for complete search history.

(56) References Cited

U.S. PATENT DOCUMENTS

| | | | |
|---|---|---|---|
| 8,261,246 B1* | 9/2012 | Naroff et al. ................. | 717/140 |
| 8,374,975 B1* | 2/2013 | Cierniak et al. ............... | 706/12 |
| 8,682,973 B2 | 3/2014 | Kikin-Gil et al. | |
| 2004/0260974 A1* | 12/2004 | Livshits .......................... | 714/19 |
| 2006/0031187 A1 | 2/2006 | Pyrce et al. | |
| 2006/0212865 A1* | 9/2006 | Vincent et al. ................ | 717/168 |
| 2007/0180535 A1* | 8/2007 | Seo et al. ........................ | 726/27 |
| 2008/0104149 A1* | 5/2008 | Vishniac et al. .............. | 707/205 |
| 2008/0120601 A1 | 5/2008 | Ashida et al. | |
| 2011/0295936 A1* | 12/2011 | Gill et al. ....................... | 709/203 |
| 2013/0041935 A1* | 2/2013 | Hari et al. ...................... | 709/203 |
| 2013/0073063 A1* | 3/2013 | Kiffmeier et al. .............. | 700/86 |
| 2013/0185252 A1* | 7/2013 | Palmucci ....................... | 707/608 |
| 2014/0040331 A1* | 2/2014 | Takaoka et al. ............... | 707/827 |

OTHER PUBLICATIONS

Internet website mysharepointguru.com, "Document Versioning" pp. 1-7, http://www.mysharepointguru.com/content-management/document-versioning.html captured from www.archive.org/web/ on Feb. 3, 2012.

\* cited by examiner

*Primary Examiner* — Thanh-Ha Dang

(57) ABSTRACT

Methods, systems and techniques for managing revisions of documents in a collaborative, multiuser document store are provided. Example embodiments provide an Automated Document Revision Management Server ("ADRMS") to automatically cluster and remove revisions of file content for easy navigation and management. Revisions are trimmed when necessary to conserve storage space. The ADRMS creates logical clusters of revisions based upon some measure of their similarities. That is, revisions that are similar and can be represented by the latest revision in the cluster formulate one cluster, and those that are markedly dissimilar are placed in a different cluster. The logic used to cluster revisions accounts for time-based factors, content-based factors, and context-based factors to determine whether a revision is incremental and can be grouped in the same cluster or is significant enough to warrant a new cluster. Revisions may be trimmed based upon age and/or available space by a revision trimming component.

18 Claims, 10 Drawing Sheets

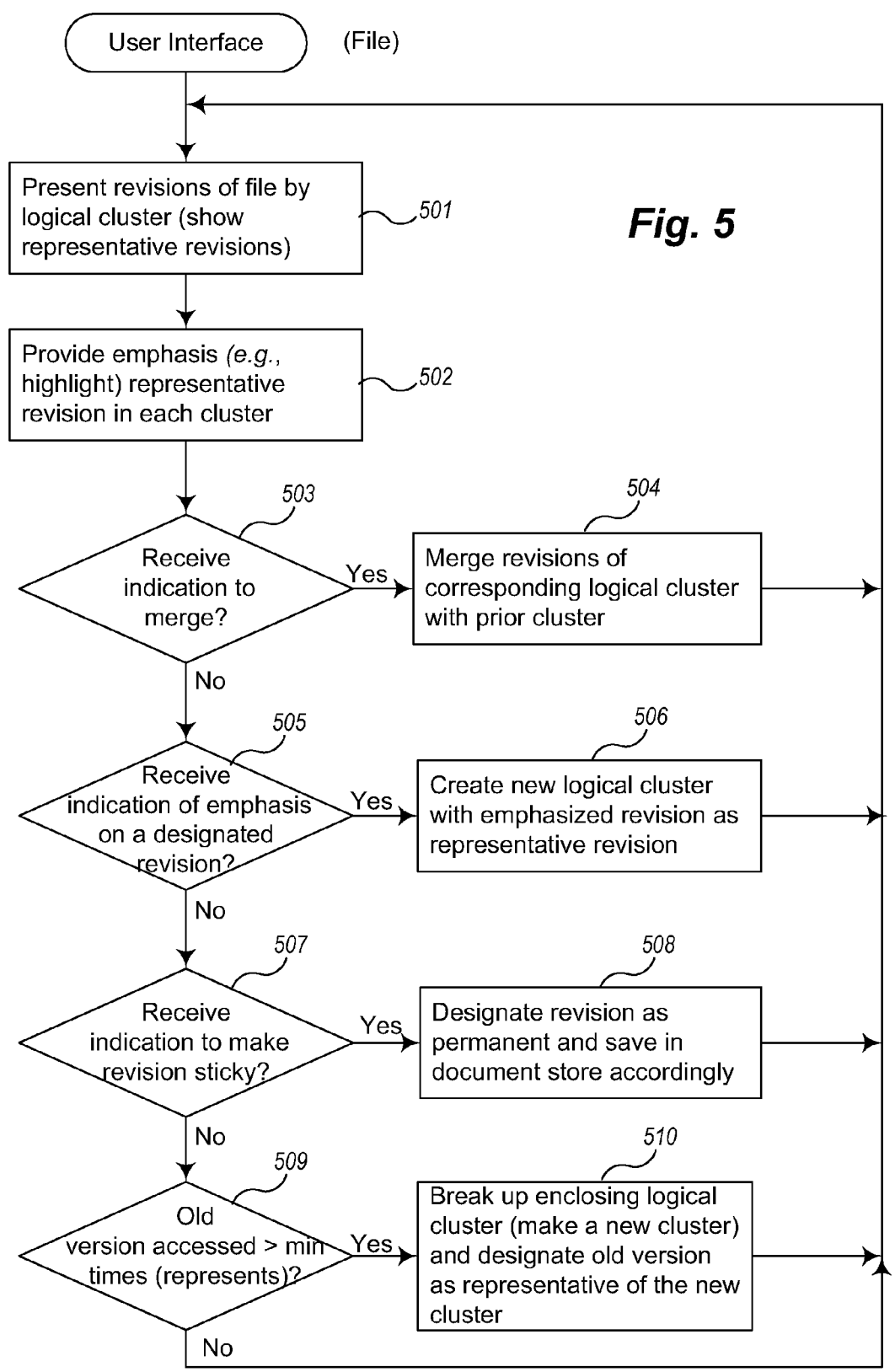

Example Revision Trimming Schedule

| Age \ Space | 3 days | 7 days | 14 days | 1 month | 3 months |
|---|---|---|---|---|---|
| 80% | - | hide 50% delete 10% | hide 75% delete 25% | hide 100% delete 50% | delete 100% |
| 60% | hide 30% | hide 50% delete 20% | hide 75% delete 40% | hide 100% delete 60% | delete 100% |
| 40% | hide 50% | hide 50% delete 30% | hide 75% delete 60% | hide 100% delete 80% | delete 100% |
| 20% | hide 75% | hide 75% delete 60% | hide 100% delete 80% | delete 100% | - |
| 5% | hide 100% | delete 100% | - | - | - |

*Fig. 7*

AUTOMATED DOCUMENT REVISION TRIMMING IN A COLLABORATIVE MULTI-USER DOCUMENT STORE

CROSS-NOTING TO RELATED APPLICATIONS

This Application is related by subject matter to U.S. patent application Ser. No. 13/969,230 filed on the same day as this Application, which is incorporated herein by reference in its entirety.

TECHNICAL FIELD

The present disclosure relates to methods, techniques, and systems for trimming revisions in particular to trimming revisions of documents or files.

BACKGROUND

Multiuser environments such as those found in enterprise computing environments generate very large numbers of electronic documents in sometimes very short intervals. In many such environments, it can be important to save all revisions of a single document, especially when multiple users are collaborating to update the document over time or the document is being shared among multiple users. When storage is not limited in any way, all revisions of the document can be stored permanently in a document store, such as those implemented by traditional document management systems. However, when storage becomes scarce, some (typically older) versions of a document must be deleted and/or the older versions may be moved to backup storage. This process is often a manual one unless the document management system is programmed to delete documents older than some date.

In addition, as more and more revisions are generated, navigating among such revisions to find a particular change in the past may become unwieldy for a user looking to find a particular change to a particular document, or for example, to restore an old version of the document. A user must simply guess at when a particular update was made, for example, by knowing roughly when a change was instituted and then search the revisions created near that date until the update is located.

BRIEF DESCRIPTION OF THE DRAWINGS

FIG. 5 is an example flow diagram of an example user interface logic for use with an example Automated Document Revision Management Server.

FIG. 7 is an example block diagram of an example revision trimming schedule.

DETAILED DESCRIPTION

Embodiments described herein provide enhanced computer- and network-based methods, systems, and techniques for automatically clustering and removing revisions of file content to allow them to be more easily navigated, managed, and trimmed when necessary to conserve storage space. Such revisions may be used, for example, to store snapshots of documents used in a collaborative, multi-user document store, potentially by multiple users and accessed from multiple client devices, such as documents found within a document management system or even a general purpose file system.

Further, in some environments, for example those that attempt to deliver a near real-time collaboration experience between a multitude of users, a client agent running on a device will try to push (e.g., forward, transfer, update, send, etc.) updates (e.g. changes, edits, modifications, etc.) as they occur to a server that manages the document store, often resulting in many revisions being created within a very short period of time. For many users, it is impractical and expensive to retain every such revision created in this manner. To conserve storage space in the system and to unburden the users from manually managing the exploding amount of revision history, example embodiments provide an Automated Document Revision Management Server ("ADRMS") to automatically manage these revisions over time. In some embodiments, the ADRMS is employed to trim revisions deemed to be excessive or unnecessary based upon one or more of time, amount of storage available or remaining, or other factors. A variety of algorithms and/or heuristics may be incorporated for this purpose.

In summary, the ADRMS creates logical clusters (e.g., groups, collections, etc.) of revisions based upon some measure of their similarities. That is, revisions that are similar and can be represented in essence by the latest revision in the cluster formulate one cluster, and those that are markedly dissimilar are placed in a different cluster. A variety of algorithms and/or heuristics may be used to determine, given a particular revision, whether it should be grouped (e.g., placed, collected, etc.) into a current cluster because it represents an incremental (e.g., small, insignificant, or some other measure of not substantially different) change or whether it should be placed into a new cluster because it represents a significant (e.g., larger, substantial, or some other measure of substantially different) change. The rules take into account time-based factors, content-based factors, and context-based factors. In some embodiments, the clusters may be physical as well as logical.

Figure 1:
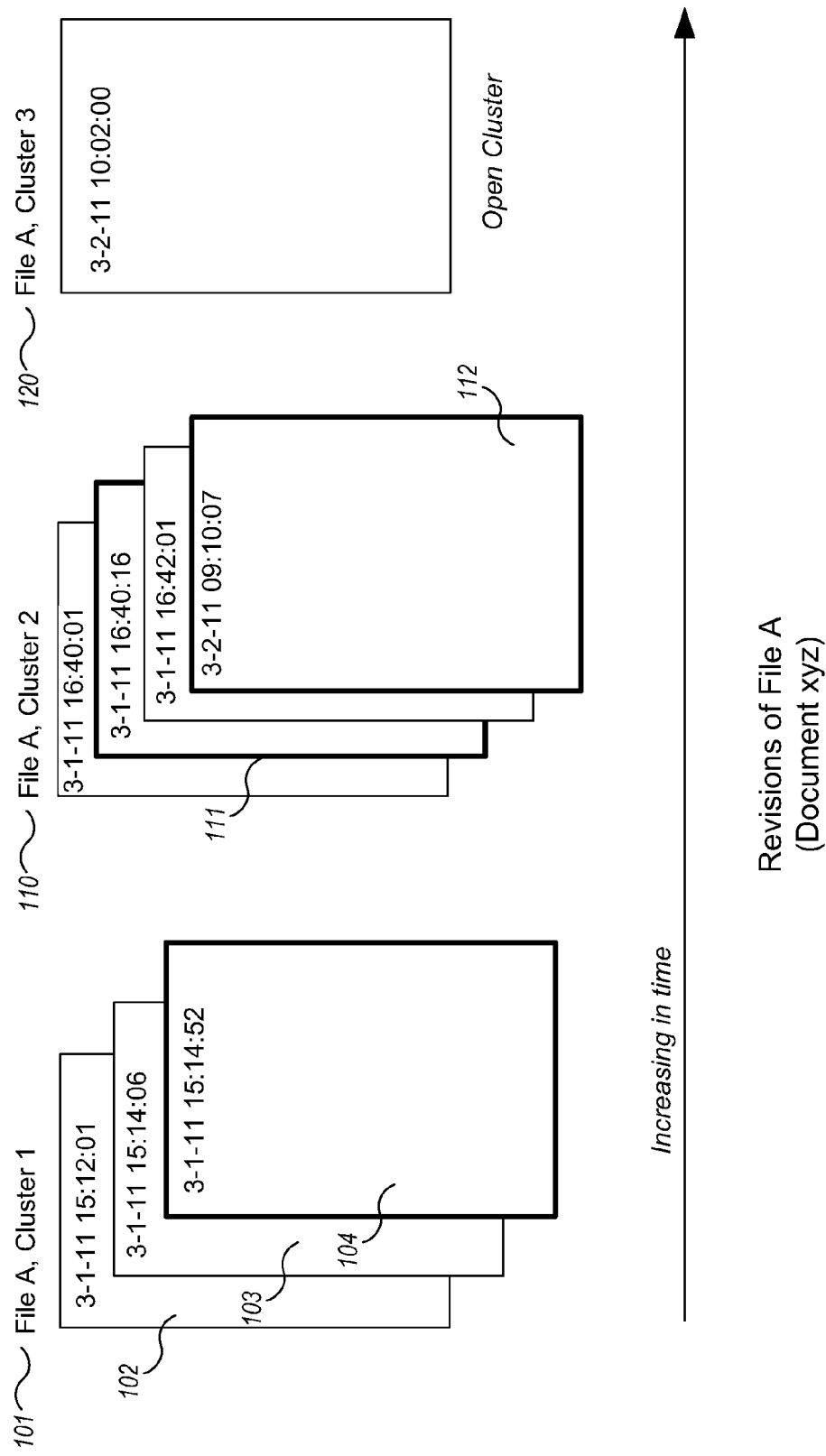
FIG. 1 is an example block diagram of example clusters of revisions of a file built by an example Automated Document Revision Management Server.

FIG. 1 is an example block diagram of example clusters of revisions of a file built by an example Automated Document Revision Management Server. FIG. 1 shows the revisions of a single document xyz, stored as "File A," shown over time. In this disclosure, the terms file and document are used interchangeably; however, it is noted that, in different document stores and/or file systems, a document may comprise multiple files and/or a file may comprise multiple documents. A revision may be created, for example, each time a user invokes a save or update command or whenever the client agent running on a client machine chooses to update the document store stored on the server.

In the snapshot of the document store shown, the ADRMS has created thus far three clusters (either logically or physically), cluster 1 101, cluster 2 110, and cluster 3 120. They are shown in the figure as they are created and stored over time. Only one cluster, cluster 3 120, is an "open" cluster. That is, as new revisions are examined by the server, the new revisions are either added to this cluster, or this cluster is "closed" and a new cluster (not shown) is created. Clusters 1 (101) and 2 (110) are at this point in time considered closed clusters. Cluster 1 101 is shown containing (e.g., having grouped or collected, etc.) three revisions 102-104, whose date and timestamps are displayed to see that the revisions are stored in time order. Cluster 2 110 is shown containing four revisions, and cluster 3 is shown with only 1 revision.

In each cluster, typically one revision is automatically selected by the ADRMS to be a "representative revision" of that cluster. The representative revision is meant to capture the essence of the group of revisions made to the file as stored in a particular cluster. Typically, the most recent (last) revision grouped into the cluster is considered its representative revision. For example, in cluster 1 101, revision 104 (shown in bold) is the designated representative revision; in cluster 2 110, revision 112 (shown in bold) is the designated representative revision; and, because cluster 3 120 is still open, no revision is yet designated as the representative revision. In other example, an open revision designates its latest revision as the representative revision and this is moved each time a revision is added to the open cluster.

In some example ADRMSes, a user may designate a particular revision as "sticky" (e.g., permanent, not to be removed, etc.). In the example of FIG. 1, the second revision 111 in cluster 2 110 has been designated as sticky. As such, revision 111 is shown in bold.

The example revision history shown in FIG. 1 may reflect a scenario in a collaborative multiuser document store where the file is first updated by a first user on a first client device, for example, at work and then the same file is later updated by the first user on a second client device, for example, the user's laptop. Later, a second user may update the file from yet a third computer. The particular clustering logic employed by the ADRMS (as shown in FIG. 1) may start a fresh cluster each time a new user updates the file or each time a new device updates the file. This and other logic for formulating clusters is described further below.

Once logical clusters are created, a user interface may present to a user a smaller number of revisions of a particular document, since each cluster may be effectively represented by a representative revision. In some example ADRMSes, the user can expand the revision list to present more revisions, as necessary. In addition, the ADRMS may use a revision trimming component (e.g., engine, code, logic, instructions, and the like) to hide from user view or delete revisions altogether, when a certain amount of time has passed, storage is becoming lessened, or for any other reason incorporated into the revision trimming component.

Although described in the context of document stores, multiuser environments, and file systems, the techniques of the ADRMS may be used in other environments, especially where updates happen frequently, and that are charged with keeping a revision history over some period of time.

Figure 2:
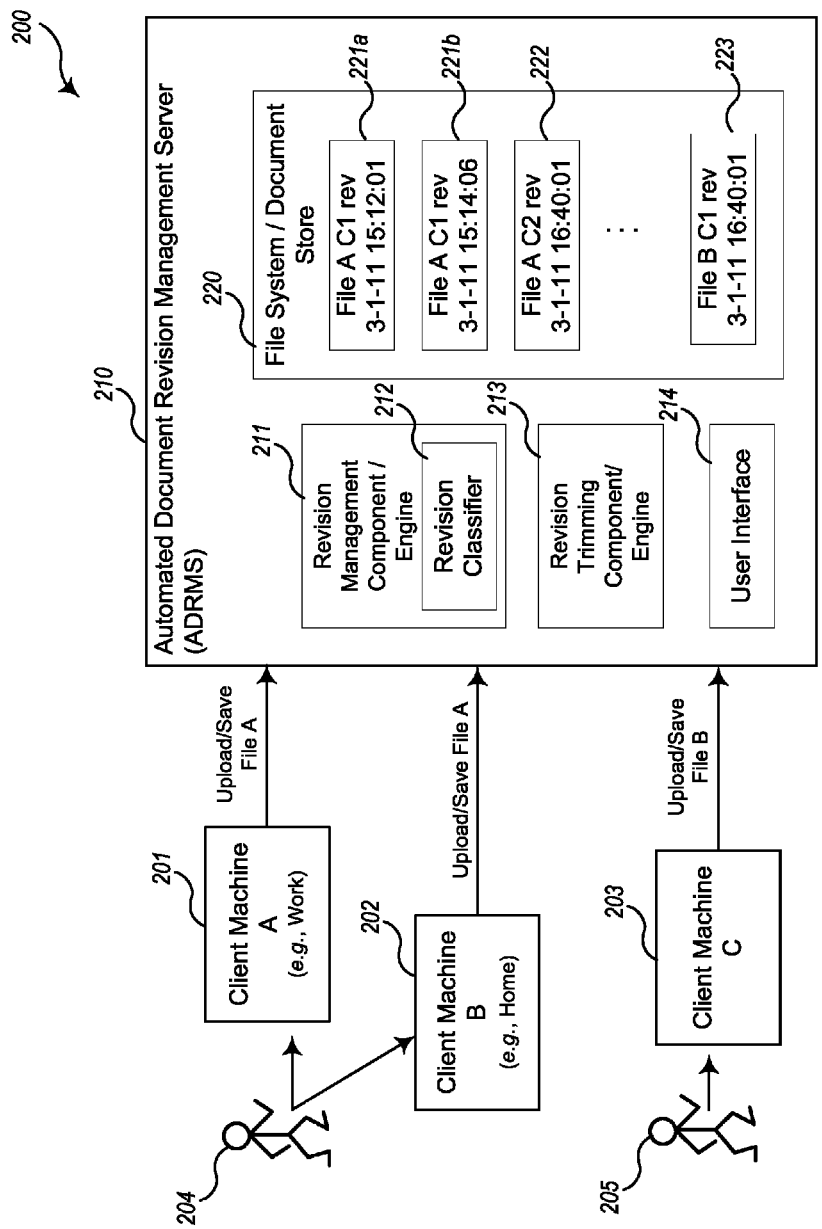
FIG. 2 is an example block diagram of an example Automated Document Revision Management Server used with a collaborative multi-user document store.

FIG. 2 is an example block diagram of an example Automated Document Revision Management Server used with a collaborative multi-user document store. In a multiuser, collaborative document management environment 200, the ADRMS comprises one or more functional components/modules that work together to manage document revision history. These components may be implemented in software or hardware or a combination of both. In FIG. 2, a ADRMS 210 comprises a revision management component/engine 211; a revision trimming component/engine 213; a user interface 214; and a file system or document store 220. The ADRMS may interact with one or more users, here shown as a first user 204 and a second user 205, which use their respective client devices 201-203 to communicate updates of one or more files to the document store 220.

The revision management component 211 includes a revision classifier 212 for classifying (e.g., determining, choosing, selecting, and the like) whether a revision is to be grouped into an existing cluster or used to start a new cluster. Example logic for making this determination is described further with respect to FIGS. 4a-4c. Although shown as a separate component, revision trimming component 213 may be implemented as part of the revision management component 211, or may be implemented in a separate, or even a third party server (not shown).

The document store 220 contains one or more revisions 221a, 221b, 222, and 223, organized into clusters as described herein. In the snapshot in time displayed in FIG. 2, file A has two clusters. A first revision 221a is stored in cluster 1, a second revision 221b is stored in cluster 1, and a third revision 222 is stored in cluster 2. The fourth revision 223 is stored in cluster 2 of file A.

As described with respect to FIG. 1, the first client device 201 may be a machine at the first user's 204 work, the second client device 202 may be a machine at the first user's 204 home, and the third client device 203 may be a machine of the second user 205. When a revision of the file (e.g., file A or file B) is saved or uploaded to the server, the ADRMS categorizes (e.g., collects, groups, or clusters) the revision into a particular cluster using revision management component 211, and potentially trims revisions as appropriate (then or at other times) using revision trimming component 213. The user interface 214 displays one or more clusters and revisions to the one or more users 204 and 205 through the one or more client devices 201-203.

The techniques of an Automated Document Revision Management Server are generally applicable to any type of document or file. For example, the techniques described herein may be used with files stored in any type of file system, objects stored in any type of data store, or any linear byte stream of data. In addition, the concepts and techniques described are applicable to other architectures, protocols, devices, etc. Essentially, the concepts and techniques described are applicable to any file, document, or object revision management.

Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement an Automated Document Revision Management Server to be used for managing document or file revisions. Other embodiments of the described techniques may be used for other purposes. In the following description, numerous specific details are set forth, such as data formats, logic, and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like.

Figure 3:
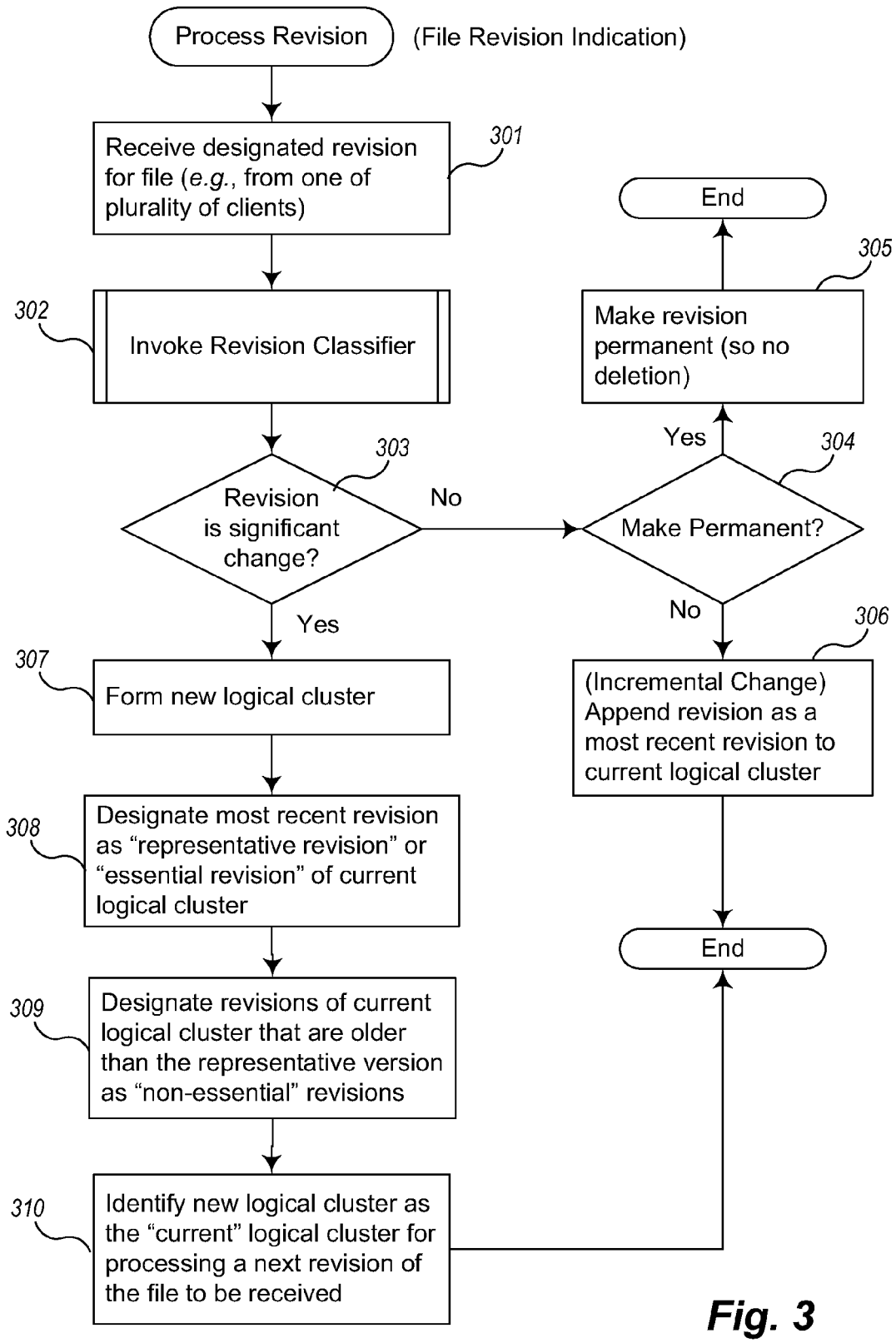
FIG. 3 is an example flow diagram of example logic to process a revision.

FIG. 3 is an example flow diagram of example logic to process a revision. This logic may be invoked, for example, from a revision management component/engine 211 of the ADRMS illustrated in FIG. 2, to process a revision received from a client device to determine whether it should be grouped into an existing cluster or used to form a new cluster. In addition, since some user interfaces allow a user to mark a revision permanent (when first stored in the document stored), the logic proceeds accordingly.

Specifically, in block 301, the logic receives a revision indicated by a user or a client device. The revision is designated as part of a file (or document) to be stored in the file system or document store such as document store 220 in FIG. 2. In block 302, the logic invokes a revision classifier to determine whether the revision is an insignificant (e.g., not significant) or a significant change. An example revision classifier is described with reference to FIGS. 4a-4c. In some ADRMS embodiments, there may be a plurality of revision classifiers invoked to classify a revision.

In block 303, the logic determines whether the revision was determined by the revision classifier to be a significant change, and if so, the logic continues in block 307, otherwise continues in block 304. If, in block 304, the logic has determined that the revision is not a significant change, then the logic determines whether the revision has been designated as permanent. If so, then the logic continues in block 305 to mark the revision permanent so that it may not be deleted by a trimming component such as revision trimming component 213 of FIG. 2. If not (the revision is not designated as permanent), the logic instead continues in block 306 to append the revision as a most recent revision to the logical cluster designated as the "current" logical cluster. The logic then proceeds to completion.

In block 307, after determining that the revision represents a significant change, the logic then forms a new logical cluster because the revision is too different from the current logical cluster to be added to it. In block 308, the logic designates the most recent revision (previously added) to the current logical cluster as the "representative revision," or "essential revision" because it is to be kept. In some embodiments, in block 309, the revisions that are older than the designated representative (or essential) revision are designated non-representative or non-essential revisions. This indicates to a trimming component that they are available to be deleted when necessary. At this point, the current logical cluster is considered closed.

In block 310, the new logical cluster is designated as the new "current" cluster so that it can accept the next one or more revisions to be received if they constitute non significant changes to the file/document.

Then logic then proceeds to completion.

Figure 4A:
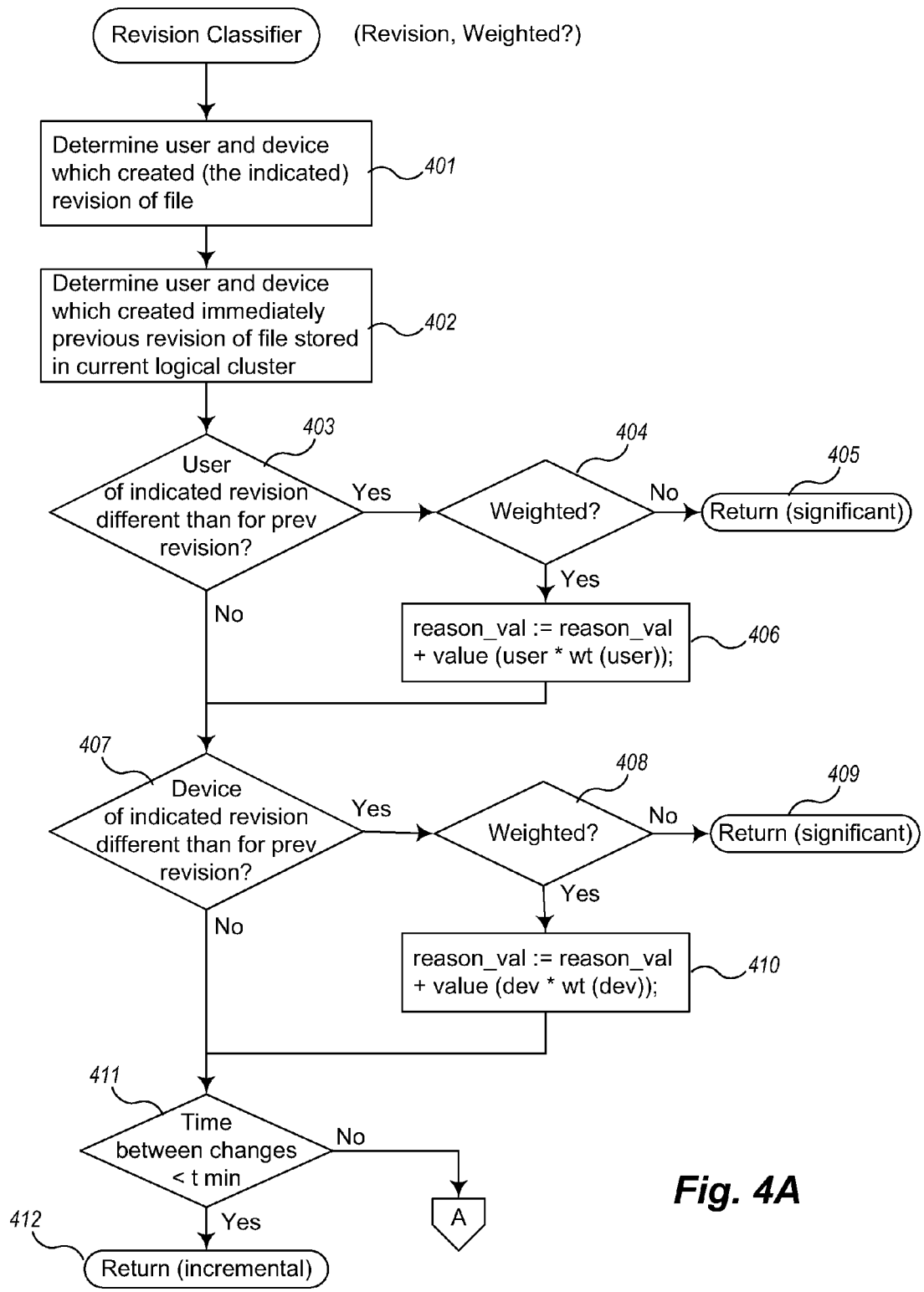
FIGS. 4a-4c are an example flow diagram of example logic executed by a revision classifier to classify a revision.
Figure 4B:
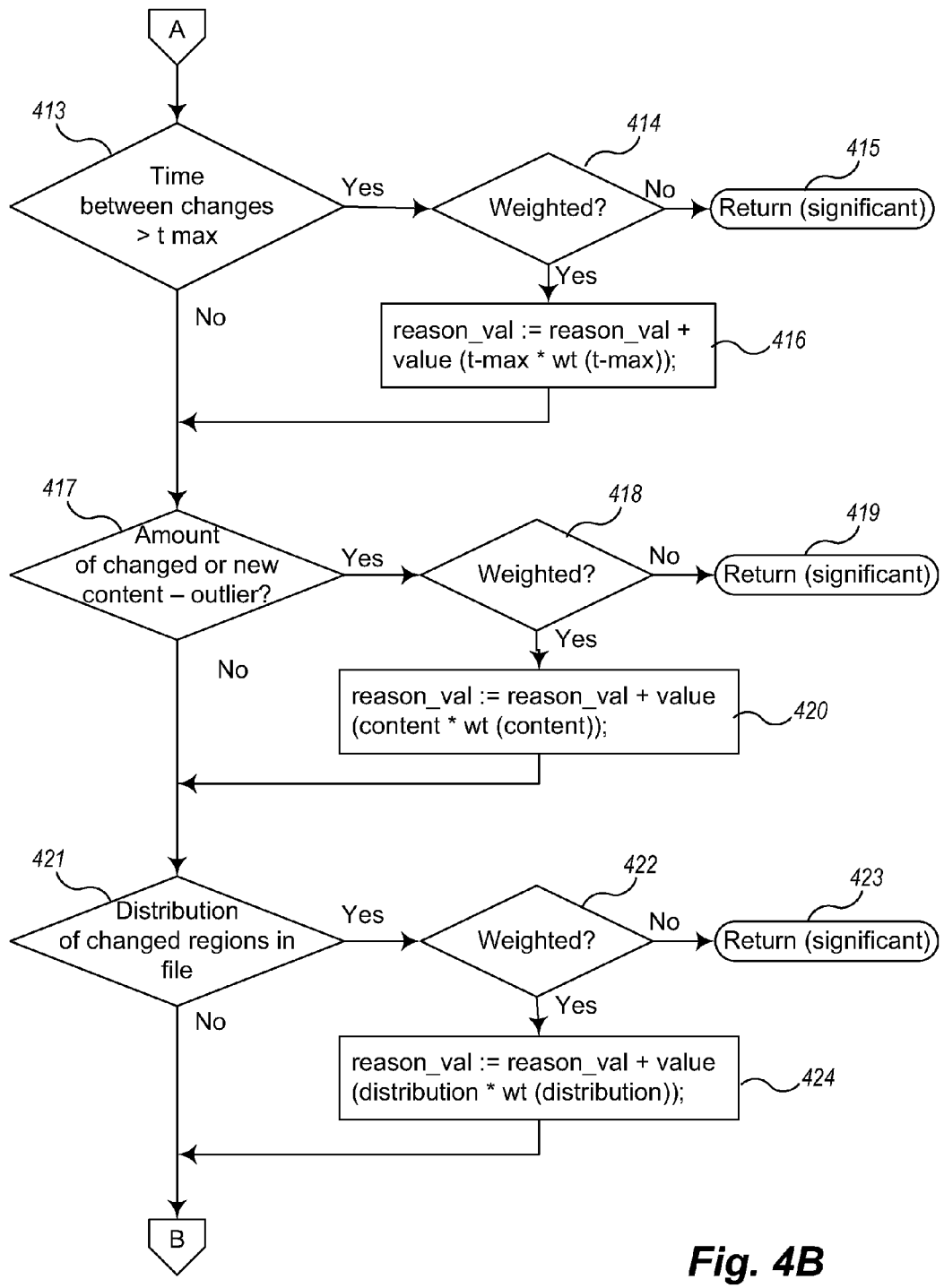
Figure 4C:
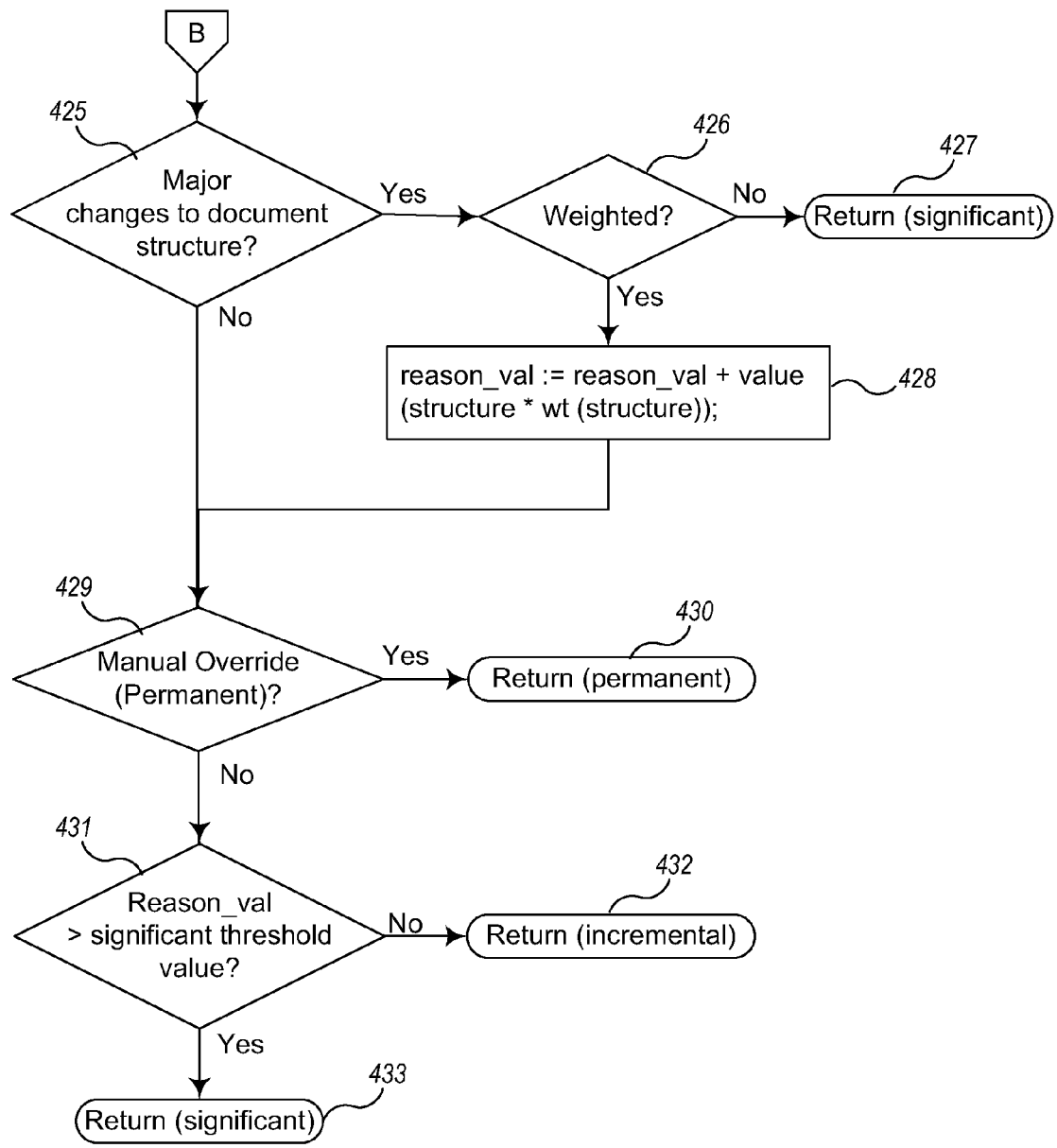

FIGS. 4a-4c are an example flow diagram of example logic executed by a revision classifier to classify a revision. This logic may be executed, for example, by a revision classifier 212 of the ADRMS shown in FIG. 2. As described earlier, there may be a plurality of revision classifiers, each implementing a particular rule, heuristic, algorithm or logic to designate a revision as significant (worthy of forming a new cluster) or incremental (e.g., non-significant, insubstantial, etc.). The rules account for time-based factors, content-based factors, and context-based factors. In some example ADRMSes, the rules are ordered for efficiency reasons, so that once the revision is determined to be significant, the classification process can stop. In some example ADRMSes, the rules are weighted, and the determination as to whether a particular revision is significant or not is decided based upon a cumulative score. If it exceeds a value, the revision is considered significant, otherwise it is not. In the logic illustrated in FIGS. 4a-4c, the rules are presented according to one ordering or arrangement. Other orderings or arrangements may be similarly incorporated.

In one embodiment, the ADRMS assigns revisions created by different users or by different devices to a new cluster, as usually this signifies a change in client device (e.g., the user has gone from one machine to another, and perhaps wants to "check in" changes), or a different collaborative content. Similarly, changes that are created in under a certain period of time (e.g., a certain number of hours like "4 hours," or which may be predetermined or a configurable parameter") may be assumed to be incremental changes (e.g., non significant, insubstantial, etc.). Also, changes that are newer than the last change by a certain period of time (e.g., a certain number of days like "7 days," or which may be predetermined or a configurable parameter") may be assumed to be significant changes (e.g., substantial, not incremental, etc.). Also, whether or not a change or revision is incremental or significant may depend upon how much has content has changed, whether the change is an "outlier" from the prior changes, the distribution of changed regions, areas, or portions of the file/document, whether the change constitutes a major change to the document structure, whether an older version has been accessed frequently (therefore, it may behoove the ADRMS to designate that version as a representative version and close the cluster), or whether the user or system has indicated a manual override. Other rules and heuristics may be incorporated, even dynamically, into ADRMS logic arranged to execute a dynamically provided set of rules.

More specifically, in block 401, the logic determines the user and the device that uploaded/created (e.g., associated with) the indicated revision of the file/document. In block 402, the logic determines the user and the device that uploaded/created (e.g., associated with) the immediately previous (in time) revision stored in the current logical cluster. In block 403, if the user associated with the indicated revision is different than the user associated with the immediately previous revision, then the logic continues in block 404, otherwise continues in block 407 to process the next rule. In block 404, the logic determines if weighting was indicated, and, if so, continues in block 406 to assign a weighted value of this criteria to a cumulative score based upon a weighting assigned to a revision created by a different user, and then continues to check the other rules in block 407. Otherwise, in block 405, the logic returns an indication that the indicated revision is significant.

In block 407, the logic determines whether the device associated with the indicated revision is different than the device associated with the immediately previous revision. If so, then the logic continues in block 408, otherwise continues in block 411 to process the next rule. In block 408, the logic determines if weighting was indicated, and, if so, continues in block 410 to assign a weighted value of this criteria to a cumulative score based upon a weighting assigned to a revision created by a different device, and then continues to check the other rules in block 411. Otherwise, in block 409, the logic returns an indication that the indicated revision is significant.

In block 411, the logic determines the amount of time that has elapsed since the time associated with the immediately previous revision (for example, the time each revision is created, the time elapsed between changes, etc.) and whether it is less than a predefined or configurable minimum value. For example, it may be the case that changes performed very quickly, such as under a certain number of hours (e.g., t-min), can be generally correlated to incremental updates. If so, then the logic continues in block 412, and returns an indication that the indicated revision is incremental. If not, then the logic continues in block 413 to process the next rule.

In block 413 the logic determines whether the amount of time that has elapsed since the time associated with the immediately previous revision is greater than a predefined or configurable maximum value. For example, it may be assumed that a user would want to retain changes if they occurred awhile back, such as longer than a certain number of days ago. If so, then the logic continues in block 414, otherwise continues in block 417 to process the next rule. In block 414, the logic determines if weighting was indicated, and, if so, continues in block 416 to assign a weighted value of this criteria to a cumulative score based upon a weighting assigned to a revision created after a threshold time (e.g., t-max), and then continues to check the other rules in block 417. Otherwise, in block 415, the logic returns an indication that the indicated revision is significant.

In block 417 the logic determines whether the amount of changed or new content in the file exceeds a threshold amount and if so, continues in block 418, otherwise continues in block 421 to process the next rule. For example, it may be assumed that the more changes that are made in the new revision, the more likely they can be correlated to a significant change. In one embodiment, a size dependent threshold is used to make this determination. Because a fixed size of a change or fixed percentage of change may not work well with files of varying sizes, the formula shown in equation (1) may be used:

$$\frac{\Delta s_i}{s_{i-1}} > \frac{1}{\ln(s_{i-1})} \quad (1)$$

Where $\Delta s_i$ is the number of bytes changed or added in revision i, and $s_i$ is the byte size of revision i. If equation (1) holds true, then a new cluster is started (i.e., the revision is considered significant). The number of changed bytes may be determined by a variety of algorithms, including those that determine a number of new data chunks added to a file either with new data, or with data referenced in other files as described in U.S. application Ser. No. 13/784,551, filed on Mar. 4, 2013, entitled "Cross-File Differential Content Synchronization," and U.S. application Ser. No. 13/784,557, filed on Mar. 4, 2013, entitled "Cross-File Differential Content Synchronization Using Cached Patches, herein incorporated by reference in their entireties.

In some instances, once the cluster has at least 10 or more revisions, the logic switches to an outlier detection algorithm, for example, one using a modifier Z-score calculation as shown in equation (2) below:

$$M_i = \frac{0.6745(x_i - x_m)}{MAD} \quad (2)$$

where $x_i$ is the number of bytes changed or added in revision i, and $x_m$ is the median number of bytes changed or added in the current logical cluster and MAD is the median of the absolute deviation in the cluster. Whenever $|M_i|$ (the absolute value of $M_i$)>3.5, the received revision tests as an outlier and causes a new cluster to be started by indicating that the revision constitutes a significant change. Other outlier detection algorithms can similarly be employed.

Accordingly, in block 418, when the revision is considered significant by employing a technique similar to that indicated to determine whether the amount of changed or new content exceeds some value, then the logic determines if weighting was indicated. If so, the logic continues in block 420 to assign a weighted value of this criteria to a cumulative score based upon a weighting assigned to a revision with sufficient changed content, and then continues to check the other rules in block 421. Otherwise, in block 419, the logic returns an indication that the indicated revision is significant.

In block 421 the logic determines whether the distributions (locations) of the changes to the file suggest a small incremental change or a significant change. For example, multiple dispersed changes to file may suggest a larger, more significant change whereas localized changes may suggest an incremental change. In one example classifier, an outlier detection algorithm as suggested by equation (2) above may be used substituting the number of changed bytes for the number of changed regions. These changes may also be determined by a variety of algorithms, including those that determine a number of new data chunks added to a file either with new data, or with data referenced in other files as described in U.S. application Ser. Nos. 13/784,551 or 13/784,557. If the change is considered significant, then in block 422 the logic determines if weighting was indicated, and, if so, continues in block 424 to assign a weighted value of this criteria to a cumulative score based upon a weighting assigned to a revision with sufficient distributions of changed content, and then continues to check the other rules in block 425. Otherwise, in block 423, the logic returns an indication that the indicated revision is significant.

In block 425, the logic determines whether the revision reflects a major change to the document structure, for example, an addition of a new chapter, or section, and, if so, continues in block 426, otherwise continues block 429 to process the next rule. In block 426 the logic determines if weighting was indicated, and, if so, continues in block 428 to assign a weighted value of this criteria to a cumulative score based upon a weighting assigned to a revision reflecting a major change to document structure, and then continues to check the other rules in block 429. Otherwise, in block 427, the logic returns an indication that the indicated revision is significant.

In block 429, the logic determines whether the indicated revision already has been designated as sticky (or permanent), and if so then continues in block 430 to indicate that the revision is permanent, otherwise continues in block 431. The user interface also gives the client (user or device) a chance to designate a particular revision once it is stored as sticky and other opportunities to create clusters, merge clusters, as described below with reference to FIG. 5.

In block 431, the logic determines whether the sum of the weighted significance values exceeds a threshold (predetermined or configurable). If so, then the logic returns an indication that the indicated revision is significant in block 433, otherwise returns an indication that the indicated revision is incremental in block 432.

Of note, other rules, and orders of evaluation can be incorporated into the classifier logic.

FIG. 5 is an example flow diagram of an example user interface logic for use with an example Automated Document Revision Management Server. The user interface logic may be implemented, for example, by the user interface component 214 of the ADRMS illustrated in FIG. 2 to interact with client devices to allow users to navigate the revision history of documents and to manage revisions manually. The actions illustrated are examples; other actions or different actions may be performed by the user interface. Also, the logic is shown as a continuous loop that processes user input, although other coding techniques such as event driven handlers may be used.

For example, in block 501, the user interface logic may present the revisions of a document organized by logical cluster. Initially, the user interface may only show the representative (essential) revision of each logical cluster and allow the user to expand each cluster to show its non-essential revisions if desired. This can be presented similar to expansion/contraction data structures used with browsers of a file system, a tree structure, or by other means. In block 502, the logic can provide emphasis as necessary to show representative revisions, sticky revisions, as needed to assist users.

In blocks 503-510, the logic processes the different user inputs (or automated actions) that may occur when the user interface is presented. More specifically, in block 503, the logic determines whether it has received an indication that two (or more) logical clusters are to be merged. If so, the logic continues in block 504, otherwise continues in block 505. In block 504, the logic merges the revisions as indicated (e.g., the logical cluster identified with a prior cluster) and determines what revision should be designated the representative revision. By default, it may be the newest revision in the merged cluster, or the user may have indicated otherwise.

In block 505, the logic determines whether it has received an indication that a particular revision has been designated (e.g., by emphasis, such as a selection, emboldening, etc.) as a representative revision of a new cluster to be split off. If so, the logic continues in block 506, otherwise continues in block 507. In block 506, the logic creates a new logical cluster with the emphasized revision as its representative revision.

In block 507, the logic determines whether it has received an indication that a particular revision is to be made "sticky" (permanent, not trimmed, not deleted, etc.). If so, the logic continues in block 508, otherwise continues in block 509. In block 508, the logic designates the revision as permanent and it is saved in the document store accordingly.

In block 509, as a background action, the logic determines whether one of the older revisions in a logical cluster has been accessed a certain (predetermined or configurable) number of times. If so, then in block 510, the logic causes a new cluster to be created and designated the one of the older revisions that has been so accessed as the new representative revision. Although placed after the other user actions, this action could be done at anytime by the user interface logic, or by another logical component such as the revision management component/engine 211 of the ADRMS illustrated in FIG. 2.

Other actions not shown may be also incorporated.

The logic then continues to the beginning of the loop in block 501.

Figure 6:
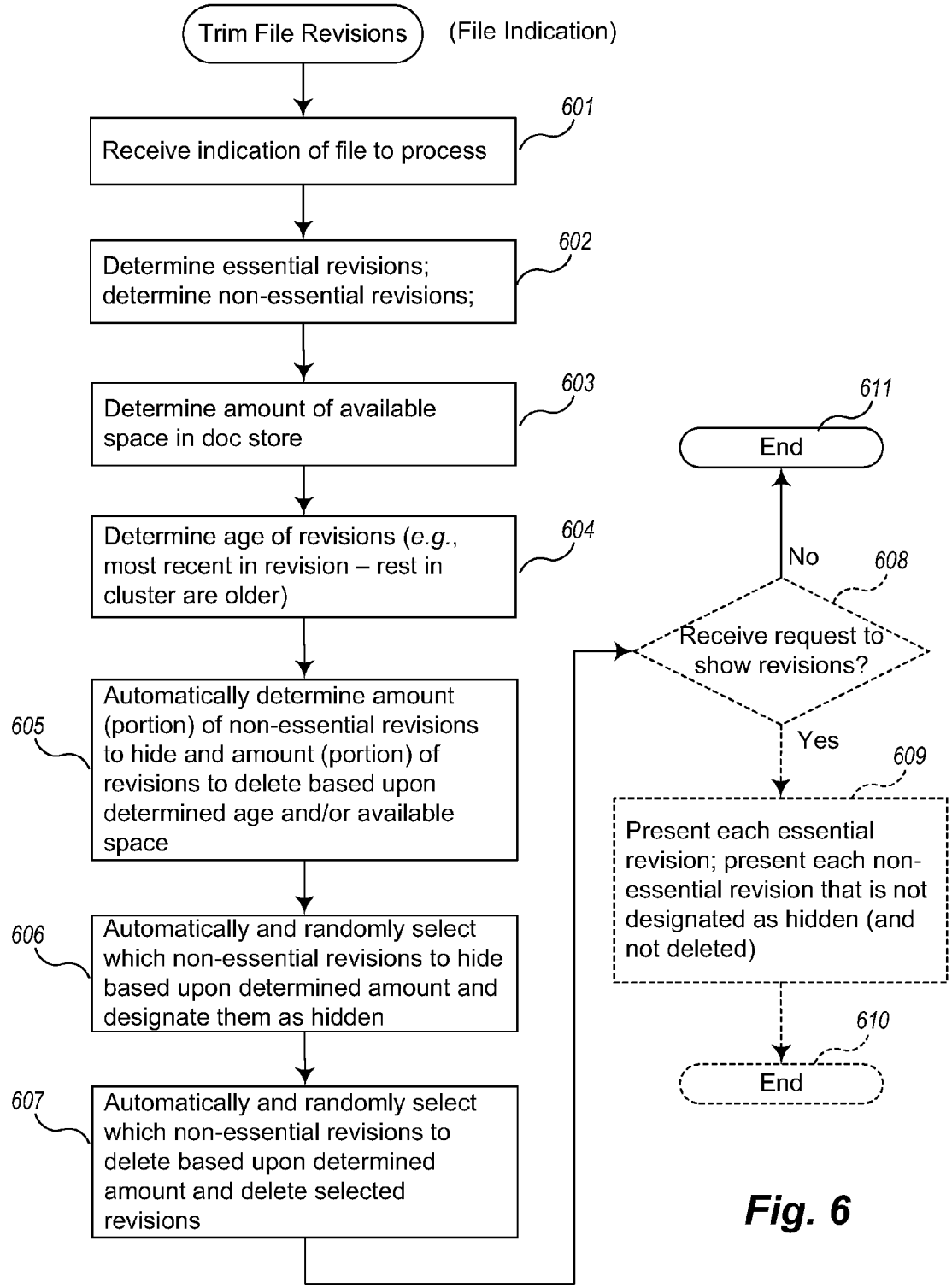
FIG. 6 is an example flow diagram of example logic to trim revisions of a file.

FIG. 6 is an example flow diagram of example logic to trim revisions of a file. As described with reference to FIGS. 1 and 2, at times the ADRMS may determine that revisions should be hidden when presented through the user interface or actually deleted in order to conserve (e.g., save, return, preserve, etc.) space in the document store. This logic may be implemented by, for example, the revision trimming component 213 of the ADRMS 210 of FIG. 2. Generally, the older the revisions get, and the less the amount of available space, the more revisions need to be hidden and/or deleted.

Specifically, in one example embodiment, in block 601, the logic receives an indication of a file (or document) to process. In block 602, the logic determines essential (representative) revisions and non-essential revisions of each logical cluster in the document. In one implementation, by default the most recent revision of each logical cluster is considered an essential revision, and the rest are non-essential unless otherwise designated by, for example, the user interface.

In block 603, the logic determines the amount of available space in the document store.

In block 604, the logic determines the age of the revisions. This can be computed by determining the age of the most recent revision in a logical cluster and knowing that the rest of the revisions in a cluster are at least older than this.

In block 605, the logic automatically determines the amount (portion) of the non-essential revisions to hide and the amount (portion) of the non-essential revisions to delete based upon a revision trimming schedule such as that described with reference to FIG. 7. The revision trimming may be based upon age (e.g., all revisions older than 7 days may be subject to trimming), upon available storage space (e.g., when x % of storage space is consumed or is available, some portion of revisions will be deleted), or both.

In block 606, the logic automatically and randomly across all logical clusters selects which non-essential revisions to hide based upon the determined amount of revisions to be hidden indicated in the revision trimming schedule, and designates them as hidden. In some cases, the selection only occurs across the logical clusters older than the determined trimming age.

In block 607, the logic automatically and randomly across all logical clusters selects which non-essential revisions to delete based upon the determined amount of revisions to be deleted indicated in the revision trimming schedule, and deletes them. In some cases, the selection only occurs across the logical clusters older than the determined trimming age.

In one example trimming component, the selection process occurs randomly across the target logical clusters so that the size of the cluster is not disproportionately affected. That is, a schedule that indicates that 50% of all non-essential revisions of clusters older than 7 days should be deleted or hidden is accomplished by randomly selecting 50% of the non-essential revisions, regardless of the cluster to which they belong.

Optionally, in some example ADRMSes, the logic includes a block 608 which determines whether it has received a request to show revisions (after trimming) and if so continues in block 609, otherwise ends. In block 609, the logic presents each essential revision and non-essential revision that is not designated as hidden and has not been deleted or marked for deletion, and ends.

In addition, some embodiments of an ADRMS include a retention score for each revision, which is based upon factors such as access patterns that show access to old revisions. The score may be computed or recomputed whenever revision trimming takes place, whether manually or automatically. The revision trimming logic may also take into account retention scores when deciding whether to hide or delete a particular revision. For example, if a revision is chosen (e.g., selected, designated, indicated, etc.) to be hidden or deleted, the logic may check the retention score of the revision before carrying out the hiding or deleting.

FIG. 7 is an example block diagram of an example revision trimming schedule. Trimming schedule 700 may be used by the revision trimming component logic described with respect to FIG. 6 to trim non-essential revisions of a document. Schedule 700 implements revision trimming with respect to both age 701 and available space 710. Specifically, each column 702-706 shows the percentage of revisions that should be hidden and the percentage of revisions that should be deleted for revisions that are older than a designated time period given an amount of available space (each cell in the column indicates the percentage to be hidden and deleted given a particular age and space combination). Each row 711-715 shows the percentage of revisions that should be hidden and the percentage of revisions that should be deleted when a certain amount of available space remains in the system. For example, the cell 730 shows that, for clusters that include revisions that are at least 7 days old and when there remains only 60% available space left, then 50% of the non-essential revisions are to be hidden and 20% of the non-essential revisions are to be deleted. In the particular revision schedule, it is notable that after 3 months, all non-essential revisions are deleted regardless of the amount of available space. Other indications of age and space, other percentages, and other scales and arrangements can be similarly incorporated.

Figure 8:
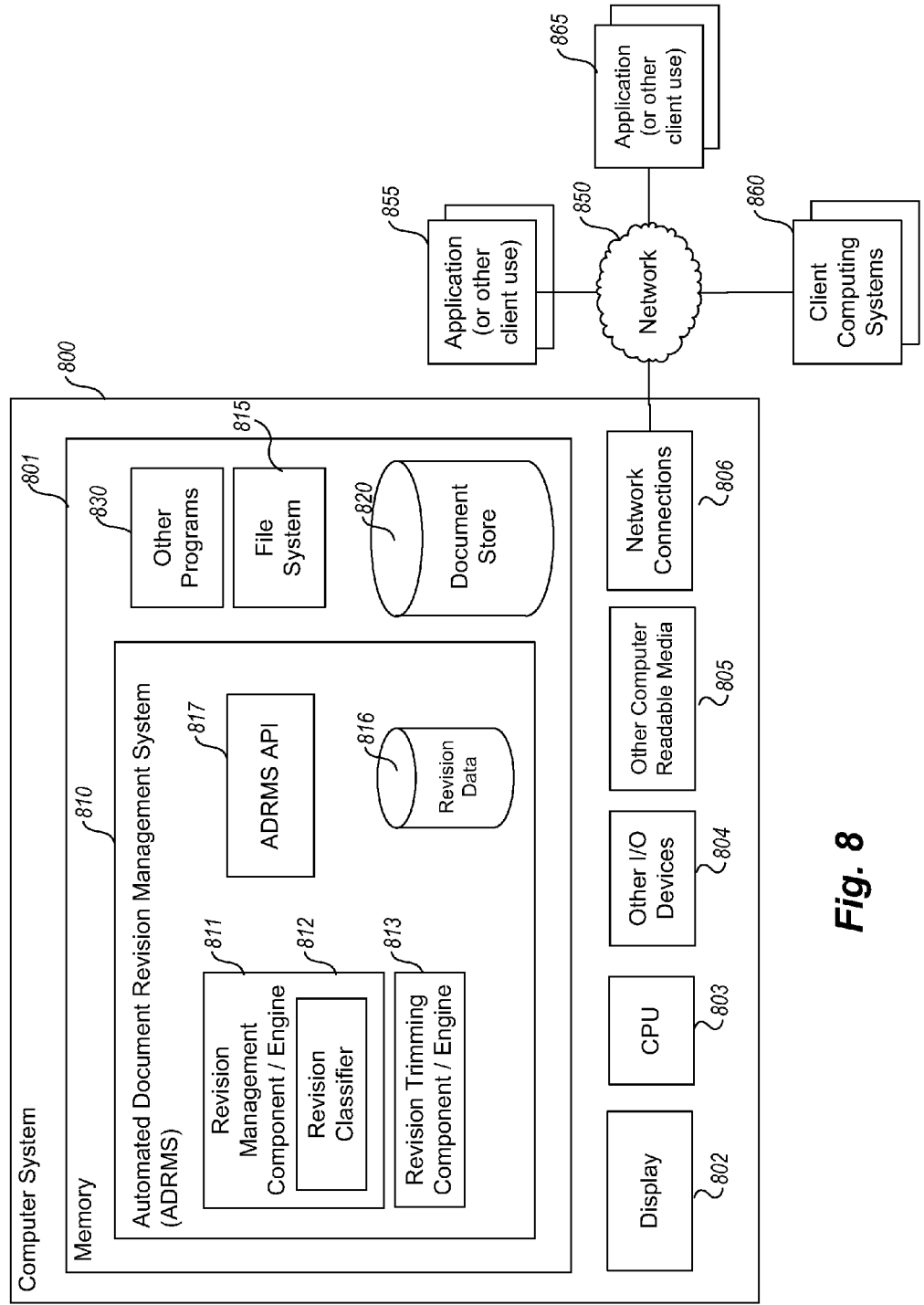
FIG. 8 is an example block diagram of a computing system for practicing embodiments of an Automated Document Revision Management Server.

FIG. 8 is an example block diagram of a computing system for practicing embodiments of an Automated Document Revision Management Server described herein. Note that a one or more virtual or physical general purpose computing systems suitably instructed or a special purpose computing system may be used to implement a ADRMS. Further, the ADRMS may be implemented in software, hardware, firmware, or in some combination to achieve the capabilities described herein.

The computing system 800 may comprise one or more server and/or client computing systems and may span distributed locations. In addition, each block shown may represent one or more such blocks as appropriate to a specific embodiment or may be combined with other blocks. Moreover, the various blocks of the ADRMS 810 may physically reside on one or more machines, which use standard (e.g., TCP/IP) or proprietary interprocess communication mechanisms to communicate with each other.

In the embodiment shown, computer system 800, comprises a computer memory ("memory") 801, a display 802, one or more Central Processing Units ("CPU") 803, Input/Output devices 804 (e.g., keyboard, mouse, CRT or LCD display, etc.), other computer-readable media 805, and one or more network connections 806. The ADRMS 810 is shown residing in memory 801. In some embodiments, the ADRMS 810 is broken into a client component as well as a server component. In such a case, the client component can be executed by a computer system organized similarly to computer system 800. In other embodiments, some portion of the contents, some of, or all of the components of the ADRMS 810 may be stored on and/or transmitted over the other computer-readable media 805. The components of the ADRMS 810 preferably execute on one or more CPUs 803 and manage the processing of revisions as described herein. Other code, logic, or programs 830, the native file system 815, and potentially other data repositories, such as data repository 820, also reside in the memory 801, and preferably execute on one or more CPUs 803. Of note, one or more of the components in FIG. 8 may not be present in any specific implementation. For example, some embodiments embedded in other software may not provide means for user input or display.

In a typical embodiment, the ADRMS 810 includes one or more revision management component/engines 811, one or more revision classifier 812, one or more revision trimming component/engines 813, and revision data 816. In at least some embodiments, the revision data 816 and/or the revision trimming component 813 is provide external to the ADRMS 810 and is available, potentially over one or more networks 850. In addition, the ADRMS may interact via a network 850 with application or client code 855 or 865 that uses revisions determined by or logic for classifying or trimming revisions computed by an ADRMS 810, and one or more client computing systems 860. Also, the revision data 816 may be made accessible to other systems over network 850.

In an example embodiment, components/modules of the ADRMS 810 are implemented using standard programming techniques. For example, they may be implemented as a "native" executables running on the CPU 803, along with one or more static or dynamic libraries. In other embodiments, the components of the ADRMS 810 may be implemented as instructions processed by a virtual machine. A range of programming languages known in the art may be employed for implementing such example embodiments, including representative implementations of various programming language paradigms, including but not limited to, object-oriented, functional, procedural, scripting, and declarative paradigms.

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces to the data stored as part of the ADRMS 810 (e.g., in the data repository 816) can be available by standard mechanisms such as through C, C++, C#, and Java APIs; libraries for accessing files, databases, or other data repositories; through scripting languages such as XML; or through Web servers, FTP servers, or other types of servers providing access to stored data. The revision data 816 may be implemented as one or more database systems, file systems, or any other technique for storing such information, or any combination of the above, including implementations using distributed computing techniques.

Also the example ADRMS 810 may be implemented in a distributed environment comprising multiple, even heterogeneous, computer systems and networks. Different configurations and locations of programs and data are contemplated for use with techniques of described herein. In addition, the server and/or client may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of a ADRMS.

Furthermore, in some embodiments, some or all of the components of the ADRMS 810 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable storage medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the U.S. patents, U.S. patent application publications, U.S. patent applications, foreign patents, foreign patent applications and non-patent publications referred to in this specification and/or listed in the Application Data Sheet, including but not limited to U.S. patent application Ser. No. 13/969,230, entitled "Automated Document Clustering In A Collaborative Multi-User Document Store" filed Aug. 16, 2013 are incorporated herein by reference, in their entireties.

From the foregoing it will be appreciated that, although specific embodiments have been described herein for purposes of illustration, various modifications may be made without deviating from the spirit and scope of the present disclosure. For example, the methods and systems for performing file synchronization discussed herein are applicable to other architectures other than a client-server architecture. Also, the methods and systems discussed herein are applicable to differing protocols, communication media (optical, wireless, cable, etc.) and devices (such as wireless handsets, electronic organizers, personal digital assistants, tablets, portable email machines, game machines, pagers, navigation devices such as GPS receivers, etc.)

The invention claimed is:

1. A computer-implemented method in a server computing system for trimming revisions of a file to facilitate management of revision growth, the revisions stored in a document store accessed by a plurality of users and received from a plurality of distinct client systems, the revisions previously grouped into a plurality of logical clusters, comprising:
automatically, under control of the computing system,
determining which revisions of the file are an essential revisions of the plurality of logical clusters and therefore represent their respective logical clusters and which revisions of the file are non-essential revisions of the plurality of logical clusters;
determining an amount of available space in the document store;
designating as hidden a portion of the non-essential revisions randomly chosen across the plurality of logical clusters and deleting a portion of the non-essential revisions randomly chosen across the plurality of logical clusters, wherein the portion of the non-essential revisions that are designated as hidden and the portion of the non-essential revisions that are deleted are determined based upon the determined amount of available space in the document store and age of the determined non-essential revisions; and
presenting the revisions of the file to a user by presenting indicators to each essential revision of each of the plurality of logical clusters and presenting by default only indicators to the non-essential revisions of each of the plurality of logical clusters that have not been designated as hidden or have not been deleted.

2. The computer-implemented method of claim 1 wherein the presenting the revisions of the file to the user further comprises:
expanding the presented revisions of the file in at least one cluster of the plurality of logical clusters to show the non-essential revisions of the at least one cluster that have been designated as hidden.

3. The computer-implemented method of claim 1 wherein the portion of the non-essential revisions that are designated as hidden and the portion of the non-essential revisions that are deleted are pre-designated lookup values indexed by the age of the non-essential revisions and the determined available space.

4. The computer-implemented method of claim 1 wherein the portion of the non-essential revisions that are designated as hidden and the portion of the non-essential revisions that are deleted are computed by a function that takes the age of the non-essential revisions and the determined available space as parameters.

5. The computer-implemented method of claim 1 wherein the portion of the non-essential revisions that are designated as hidden are 100% at least when the non-essential revisions are older than one month old.

6. The computer-implemented method of claim 1 wherein the portion of the non-essential revisions that are deleted are 100% at least when the non-essential revisions are older than three months old.

7. The computer-implemented method of claim 1 wherein, when the determined amount of available space in the document store is 80% or less, the portion of the revisions that are hidden are 50% after the revisions are a first age, are 75% after the revisions are a second age, the second age older than the first age, and 100% after the revisions are a third age, the third age older than the second age.

8. The computer-implemented method of claim 7 wherein, when the determined amount of available space in the document store is 80% or less, the portion of the revisions that are deleted are 10% after the revisions are the first age, are 25% after the revisions are the second age, are 50% after the third age, and are 100% after the revisions are a fourth age, the fourth age older than the third age.

9. The computer-implemented method of claim 8 wherein the first age is 7 days, the second age is 14 days, the third age is 1 month, and the fourth age is 3 months.

10. The computer-implemented method of claim 1 wherein the determining which revisions of the file are the essential revisions of the plurality of logical clusters determines that the latest revision of each of the plurality of logical clusters is the essential revision of that logical cluster.

11. The computer-implemented method of claim 1 wherein determining which revisions of the file are the essential revisions of the plurality of logical clusters takes into account user selections of revisions as essential revisions.

12. A non-transitory computer-readable storage medium containing instructions for trimming revisions of a file to facilitate management of revision growth, the revisions stored in a document store accessed by a plurality of users and received from a plurality of distinct client systems, the revisions previously grouped into a plurality of logical clusters, the instructions when executed by a processor caused to perform a method comprising:
automatically determining which revisions of the file are an essential revisions of the plurality of logical clusters and therefore represent their respective logical clusters and which revisions of the file are non-essential revisions of the plurality of logical clusters;
automatically determining an amount of available space in the document store;
based upon the determined amount of available space in the document store and age of the determined non-essential revisions, automatically designating a portion of the non-essential revisions to be hidden and a portion of the non-essential revisions to be deleted, wherein which of the non-essential revisions are designated to be hidden are chosen randomly across the plurality of logical clusters and wherein which of the non-essential revisions are designated to be deleted are chosen randomly chosen across the plurality of logical clusters;

automatically presenting a list of the revisions of the file to a user by presenting an indicator to each essential revision of each of the plurality of logical clusters and presenting, by default, only the non-essential revisions of each of the plurality of logical clusters that have not been designated as hidden or deleted; and automatically deleting the portion of the non-essential revisions designated to be deleted.

13. The non-transitory computer-readable storage medium of claim 12 wherein, upon receiving an indication to expand at least one cluster of the presented list of the revisions of the file, the method performs presenting the non-essential revisions of the at least one cluster that have been designated as hidden and that have not been deleted.

14. The non-transitory computer-readable storage medium of claim 12 wherein the portion of the non-essential revisions that are designated to be hidden and the portion of the non-essential revisions that are deleted are pre-designated lookup values indexed by the age of the non-essential revisions and the determined available space.

15. The non-transitory computer-readable storage medium of claim 12 wherein the portion of the non-essential revisions that are designated to be hidden and the portion of the non-essential revisions that are deleted are computed by a function that takes the age of the non-essential revisions and the determined available space as parameters.

16. A server computing system for trimming revisions of a file to facilitate management of revisions growth in a document store, the revisions accessed by a plurality of users and received from a plurality of distinct client systems, the revisions grouped into a plurality of logical clusters, comprising:
    a memory;
    a computer processor;
    a revision classifier stored in the memory and configured, when executed by the computer processor, to automatically determine which revisions of the file are essential revisions of the plurality of logical clusters and which revisions of the file are non-essential revisions of the plurality of logical clusters;
    a revision management trimming component stored in the memory and configured, when executed by the computer processor, to facilitate the management of revision growth for the file and configured to automatically:
        determine an amount of available space in the document store;
        designate as hidden a portion of the non-essential revisions, randomly selected across the plurality of logical clusters, wherein the portion of the non-essential revisions that are designated as hidden is determined based upon the determined amount of available space in the document store and age of the determined non-essential revisions; and
        delete a portion of the non-essential revisions, randomly selected across the plurality of logical clusters, wherein the portion of the non-essential revisions that are deleted are determined based upon the determined amount of available space in the document store and age of the determined non-essential revisions; and
    a user interface stored in the memory and configured, when executed by the computer processor, to present a list of the revisions of the file, wherein the list shows only essential revisions of each logical cluster unless the logical cluster has been expanded to show non-essential revisions that have been designated as hidden.

17. The server computing system of claim 16 wherein the revision management trimming component is configured to determine the portion of the non-essential revisions to be designated as hidden based upon space in the document store and age of the non-essential revisions, according to a lookup table.

18. The server computing system of claim 16 wherein the revision management trimming component is configured to determine the portion of the non-essential revisions to be designated as hidden based upon space in the document store and age of the non-essential revisions, according to a function of the space available and the age of the non-essential revisions.

* * * * *